US012540489B2

(12) United States Patent
Lorello et al.

(10) Patent No.: US 12,540,489 B2
(45) Date of Patent: Feb. 3, 2026

(54) UNIVERSAL ELECTRONIC LATCH RETRACTION MECHANISM

(71) Applicant: ASSA ABLOY Access and Egress Hardware Group, Inc., New Haven, CT (US)

(72) Inventors: Michael Lorello, Guilford, CT (US); Ryan Piantek, Higganum, CT (US); Richard D. Sangster, Jr., Madison, CT (US); Ian Sweeney, North Haven, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 166 days.

(21) Appl. No.: 18/275,768

(22) PCT Filed: Feb. 2, 2022

(86) PCT No.: PCT/US2022/014935
§ 371 (c)(1),
(2) Date: Aug. 3, 2023

(87) PCT Pub. No.: WO2022/169869
PCT Pub. Date: Aug. 11, 2022

(65) Prior Publication Data

US 2024/0125145 A1 Apr. 18, 2024

Related U.S. Application Data

(60) Provisional application No. 63/145,871, filed on Feb. 4, 2021.

(51) Int. Cl.

| | |
|---|---|
| ***E05B 47/00*** | (2006.01) |
| ***E05B 15/04*** | (2006.01) |
| ***E05B 65/10*** | (2006.01) |

(52) U.S. Cl.
CPC .......... *E05B 47/0012* (2013.01); *E05B 15/04* (2013.01); *E05B 65/1053* (2013.01);
(Continued)

(58) Field of Classification Search
CPC .... E05B 65/108; E05B 65/10; E05B 65/1046; E05B 65/1053; E05B 65/1093; F16H 2057/126
See application file for complete search history.

(56) References Cited

U.S. PATENT DOCUMENTS

| | | | |
|---|---|---|---|
| 3,374,649 | A | 3/1968 | Weidman |
| 3,614,145 | A | 10/1971 | Zawadzki |

(Continued)

FOREIGN PATENT DOCUMENTS

| | | | |
|---|---|---|---|
| CA | 3210491 A1 | | 8/2022 |
| CN | 111472619 A | * | 7/2020 |

(Continued)

OTHER PUBLICATIONS

Bogdanov et al., Universal dogging and electronic latch retraction. Co-Pending U.S. Appl. No. 17/422,963, filed Jul. 14, 2021.

(Continued)

*Primary Examiner* — Alyson M Merlino
(74) *Attorney, Agent, or Firm* — Wolf, Greenfield & Sacks, P.C.

(57) ABSTRACT

An electronic latch retraction mechanism for an exit device may include an actuator including an output shaft coupled to a crank head, where the crank head is configured to rotate between first and second rotational positions. The electronic latch retraction mechanism may also include a crank coupled to the crank head such that the crank is at least partially rotatable to the crank head, where the crank is configured to engage a push bar of the exit device to move the push bar from the from the extended position to the (Continued)

retracted position when the crank head moves from the first rotational position to the second rotational position.

20 Claims, 9 Drawing Sheets

(52) U.S. Cl.
CPC .. *E05B 65/1093* (2013.01); *E05B 2015/0413* (2013.01); *E05B 2047/0017* (2013.01); *E05B 2047/0037* (2013.01); *E05B 2047/0067* (2013.01)

(56) References Cited

U.S. PATENT DOCUMENTS

| | | | | |
|---|---|---|---|---|
| 3,730,574 | A | 5/1973 | Zawadzki | |
| 3,767,238 | A | 10/1973 | Zawadzki | |
| 3,854,763 | A | 12/1974 | Zawadzki et al. | |
| 3,873,141 | A | 3/1975 | Peterson | |
| 3,945,670 | A | 3/1976 | Peterson | |
| 4,083,590 | A | 4/1978 | Folger | |
| 4,466,643 | A | 8/1984 | Godec et al. | |
| 4,624,490 | A | 11/1986 | Miller et al. | |
| 4,801,163 | A | 1/1989 | Miller | |
| 4,875,722 | A | 10/1989 | Miller et al. | |
| 4,968,070 | A | 11/1990 | Choi | |
| 5,011,199 | A | 4/1991 | Lowe et al. | |
| 5,016,927 | A | 5/1991 | Toledo | |
| 5,340,171 | A | 8/1994 | Slaybuagh et al. | |
| 5,372,394 | A | 12/1994 | Salter et al. | |
| 5,525,880 | A | 6/1996 | Geringer et al. | |
| 5,531,492 | A | 7/1996 | Raskevicius | |
| 5,927,765 | A | 7/1999 | Austin et al. | |
| 5,969,440 | A | 10/1999 | Young et al. | |
| 6,104,594 | A | 8/2000 | Frolov et al. | |
| 6,116,661 | A | 9/2000 | Overbey et al. | |
| 6,189,939 | B1 | 2/2001 | Zehrung | |
| 6,394,508 | B1 | 5/2002 | Zehrung | |
| 6,532,777 | B2 | 3/2003 | Haeck et al. | |
| 6,565,130 | B1 | 5/2003 | Walsh, III | |
| 6,820,905 | B1 | 11/2004 | Haeck et al. | |
| 7,173,389 | B1 | 2/2007 | Gagnon | |
| 7,484,777 | B2 | 2/2009 | Condo et al. | |
| 7,883,123 | B2 | 2/2011 | Condo et al. | |
| 7,905,522 | B1 | 3/2011 | Picard | |
| 8,978,305 | B2 | 3/2015 | Morstatt et al. | |
| 10,107,015 | B2 * | 10/2018 | Geringer | E05B 65/1053 |
| 10,370,872 | B2 | 8/2019 | Pfunder et al. | |
| 11,332,961 | B2 | 5/2022 | Arlinghaus et al. | |
| 11,365,563 | B2 | 6/2022 | Ginter et al. | |
| 12,006,735 | B2 * | 6/2024 | Bogdanov | E05B 65/1053 |
| 2001/0005996 | A1 | 7/2001 | Haeck et al. | |
| 2004/0189018 | A1 | 9/2004 | Geringer et al. | |
| 2005/0012343 | A1 | 1/2005 | Warden et al. | |
| 2006/0082162 | A1 | 4/2006 | Escobar | |
| 2006/0192393 | A1 | 8/2006 | Johansson et al. | |
| 2008/0012350 | A1 | 1/2008 | Condo et al. | |
| 2009/0127869 | A1 * | 5/2009 | Condo | E05B 65/1093 292/DIG. 62 |
| 2009/0174194 | A1 | 7/2009 | Tien | |
| 2010/0123323 | A1 | 5/2010 | Geringer et al. | |
| 2011/0047874 | A1 | 3/2011 | Lowder et al. | |
| 2013/0154283 | A1 | 6/2013 | Arlinghaus et al. | |
| 2014/0001776 | A1 | 1/2014 | Tanpure et al. | |
| 2014/0109479 | A1 | 4/2014 | Morstatt et al. | |
| 2015/0184426 | A1 | 7/2015 | Arlinghaus et al. | |
| 2016/0230423 | A1 | 8/2016 | Lehner, Jr. et al. | |
| 2016/0319570 | A1 | 11/2016 | Wong et al. | |
| 2016/0333621 | A1 | 11/2016 | Lehner, Jr. et al. | |
| 2017/0102058 | A1 | 4/2017 | Stephenson | |
| 2017/0292294 | A1 * | 10/2017 | Brennan | E05B 65/108 |
| 2018/0258667 | A1 | 9/2018 | Lehner, Jr. et al. | |
| 2020/0199922 | A1 | 6/2020 | Cote et al. | |
| 2021/0189768 | A1 | 6/2021 | Jung et al. | |
| 2021/0363785 | A1 * | 11/2021 | Woodley | E05B 65/1093 |
| 2022/0018162 | A1 | 1/2022 | Bogdanov et al. | |
| 2022/0145668 | A1 | 5/2022 | Bogdanov et al. | |

FOREIGN PATENT DOCUMENTS

| | | | | | |
|---|---|---|---|---|---|
| CN | 111946158 | A | * | 11/2020 | E05B 15/00 |
| DE | 10 2010 001 195 | A1 | | 7/2011 | |
| DE | 10 2014 113 581 | A1 | | 2/2016 | |
| DE | 102017100731 | A1 | * | 7/2018 | |
| DE | 10 2019 111 870 | A1 | | 11/2020 | |
| DE | 10 2019 111 871 | A1 | | 11/2020 | |
| DE | 102019111872 | A1 | * | 11/2020 | |
| EP | 0 481 931 | A1 | | 4/1992 | |
| EP | 0485248 | A1 | * | 5/1992 | |
| EP | 1 031 688 | A1 | | 8/2000 | |
| EP | 1 031 689 | A1 | | 8/2000 | |
| EP | 2 439 363 | A2 | | 4/2012 | |
| EP | 3219885 | B1 | * | 11/2018 | E05B 47/0012 |
| EP | 3 736 400 | A1 | | 11/2020 | |
| EP | 3736400 | B1 | * | 1/2022 | E05B 47/0012 |
| FR | 2 668 790 | A1 | | 5/1992 | |
| FR | 2 685 378 | A1 | | 6/1993 | |
| FR | 2 695 675 | A1 | | 3/1994 | |
| FR | 2 720 779 | A3 | | 12/1995 | |
| GB | 2 550 281 | A | | 11/2017 | |
| KR | 2009-0036088 | A | | 4/2009 | |
| WO | WO 2012/155177 | A1 | | 11/2012 | |
| WO | WO 2014/063043 | A1 | | 4/2014 | |
| WO | WO 2019/076397 | | | 4/2019 | |

OTHER PUBLICATIONS

Bogdanov et al., Universal dogging and electronic latch retraction. Co-Pending U.S. Appl. No. 17/488,782, filed Sep. 29, 2021.
Invitation to Pay Additional Fees for International Application No. PCT/US2022/014935, mailed Apr. 11, 2022.
International Search Report and Written Opinion for International Application No. PCT/US2022/014935, mailed Jun. 10, 2022.
International Preliminary Report on Patentability for International Application No. PCT/US2022/014935, mailed Aug. 17, 2023.

* cited by examiner

UNIVERSAL ELECTRONIC LATCH RETRACTION MECHANISM

RELATED APPLICATIONS

This application is a national stage filing under 35 U.S.C. § 371 of International Application Serial No. PCT/2022/014935, filed Feb. 2, 2022, which claims the benefit of priority under 35 U.S.C. § 119(e) of U.S. Provisional Application No. 63/145,871, filed Feb. 4, 2021, the disclosure of each of which is incorporated herein by reference in its entirety.

FIELD

Disclosed embodiments are related to universal electronic latch retraction, dogging, and related methods of use.

BACKGROUND

Electronic control of exit devices is typically employed in large commercial buildings. An electronic actuator of an electronic latch retraction mechanism may be controlled to selectively latch or unlatch an exit device. Conventional exit devices may also employ a dogging mechanism which may be used to selectively prevent a latch from engaging an associated door strike. These dogging mechanisms are typically used in commercial situations where it is desirable to keep doors open for both push and pull without actuation of the latch. Conventional electronic latch retraction mechanisms and dogging mechanisms are specific to a particular latching arrangement or type of exit device.

SUMMARY

In some embodiments, a latch retraction mechanism for an exit device, the exit device including a push bar configured to move between an extended position and a retracted position, includes an actuator including an output shaft, a crank head coupled to the output shaft and configured to rotate between a first rotational position and a second rotational position a crank coupled to the crank head such that the crank is at least partially rotatable relative to the crank head, where the crank is configured to engage the push bar to move the push bar from the extended position to the retracted position when the crank head moves from the first rotational position to the second rotational position, and at least one spring coupling the crank to the crank head and transmitting force from the crank head to the crank.

In some embodiments, a method of operating a latch retraction mechanism includes engaging a mating plate coupled to a push bar with a crank, rotating a crank head from a first rotational position to a second rotational position, where rotating the crank head rotates the crank, moving the push bar from an extended position to a retracted position with the crank as the crank had rotates from the first rotational position to the second rotational position, stopping the crank when the push bar is in the retracted position, and rotating the crank head from the first rotational position to a third rotational position while the crank is stopped and the push bar is in the retracted position.

In some embodiments, an exit device includes a rail configured to be fixed to a door, a latch configured to move between an engaged position and a disengaged position, a push bar configured to move between an extended position where the latch is in the engaged position and a retracted position where the latch is in the disengaged position, and a latch retraction mechanism. The latch retraction mechanism includes an actuator including an output shaft, a crank head coupled to the output shaft and configured to rotate between a first rotational position and a second rotational position, and a crank coupled to the crank head, where the crank is operatively coupled to the push bar to move the push bar from the extended position to the retracted position when the crank head moves from the first rotational position to the second rotational position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
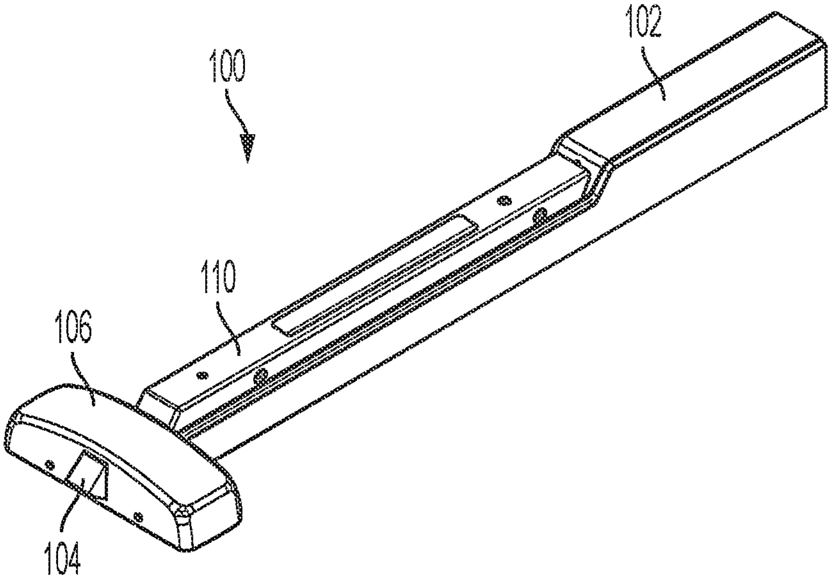
FIG. 1A is a perspective view of one embodiment of an exit device.

Conventional electronic latch retraction (ELR) mechanisms are generally limited to particular latching arrangements. That is, an ELR mechanism, which selectively retracts a push bar of an exit device to a retracted position against a biasing force urging the push bar to an extended position, precisely moves the push bar a particular distance corresponding to where the latch is disengaged (e.g., retracted). However, many exit devices and latch types have variations in the position of the push bar when the latch is fully retracted. Moreover, mechanical play (i.e., lash) and wear may alter the retracted position of the push bar over time with use of the exit device. Accordingly, conventional ELR mechanisms are designed and built for specific latching hardware. Thus, there is considerable expense and complexity in providing reliable ELR mechanisms across a range of similar but different exit devices.

In view of the above, the inventors have recognized the benefits of a universal ELR mechanism which allows for variation in the travel of a push bar across different types and sizes of exit devices. Such an arrangement allows a single universal ELR mechanism to be employed across a range of exit devices with a variety of latch arrangements having different travel characteristics. The inventors have also recognized the benefits of an ELR mechanism which is easily releasable, such that a push bar may be returned to an extended position with a biasing spring of the exit device. Additionally, the inventors have appreciated the benefits of an ELR mechanism which is releasable under a small amount of force from a biased push bar, allowing the ELR mechanism to be employed in a wide variety of exit devices having varying biasing force amounts.

In addition to the above, conventional ELR mechanisms are typically employed in large commercial building where doors may be wired for power and a central controller may be used to control the functionality of many exit devices. These conventional ELR mechanisms typically employ a solenoid which disengages the latch under power and retains the latch in the disengaged position until an operator releases the exit device. Thus, conventional ELR mechanisms may operate as dogging mechanism replacements, where an electronically controlled actuator is actively used to retain the push bar of an exit device in a retracted position, corresponding to a latch being in the disengaged position. However, these ELR mechanisms require significant amounts of constant power which limit them to wired installations. Additionally, the latch retractors are relatively inefficient and do not employ mechanical advantage to reduce the power consumption of the actuator when the exit device is in a dogged state.

In view of the above, the inventors have recognized the benefits of an ELR mechanism which employs mechanical advantage to reduce the power usage of an actuator holding a push bar in a retracted (e.g., dogged) state. Such an arrangement may be well suited to retrofit applications where power is limited (e.g., battery powered) or where energy conservation is desirable. Additionally, the inventors have recognized the benefits of employing an ELR mechanism capable of mechanically holding an exit device in a dogged state with no power consumption. Such an arrangement may be beneficial to reduce power consumption of the exit device and ensure dogging across a variety of exit devices with different latch arrangements. Additionally, such an arrangement may obviate need for a separate dogging mechanism, reducing the cost and complexity of an exit device.

In some embodiments, an ELR mechanism for an exit device includes an actuator including an output shaft and a crank head coupled to the output shaft configured to rotate between a first rotational position and a second rotational position. The crank head may be coupled to a crank configured to engage a push bar of the exit device to impart force from the output shaft to the push bar. In particular, the crank may be configured to move the push bar from an extended position when the crank head is in the first rotational position to a retracted position when the crank head is in the second rotational position. The push bar may move at least partially linearly between the extended and retracted positions. Accordingly, the rotational motion of the crank head may impart at least partially linear motion to the push bar. The amount of rotation of the crank may correspond to a specific amount of at least partially linear motion of the push bar. Accordingly, for differing exit devices, a crank may be rotated by an amount appropriate to move a push bar of a specific exit device from an extended position to a retracted position. Thus, the ELR mechanism including a crank may be universal for a wide range of push bar travel distances, as will be discussed further herein. In some embodiments, the crank may engage a mating plate which operatively couples the crank to the push bar. In some embodiments, the mating plate may be a flat plate which makes sliding contact with the crank, such that rotation of the crank moves the mating plate. The crank may be configured to engage a side of the mating plate facing the push bar of the exit device, such that the crank is able to apply force toward a door move the push bar from the extended position to the retracted position.

According to exemplary embodiments described herein, an exit device may include a rail configured to be fixed to a door. The rail may receive a push bar configured to move between an extended position and a retracted position. In the extended position, a latch of the exit device may be in an engaged position, such that the latch may engage a strike disposed in or on a door frame. In the retracted position, the latch may be in a disengaged position, such that the latch clears the strike and the door is free to swing open. The push bar is configured to move from the extended position to the retracted position on application of a force in a direction toward the rail (e.g., perpendicular to a plane of the door on which the rail is installed). The push bar may move in a manner such that the push bar moves into (or more closely to) the rail when the push bar is in the retracted position compared to the extended position. In some embodiments, the push bar may move linearly between the extended and retracted positions. In some embodiments, the push bar may move in an arc between the extended and retracted positions. In such an arrangement, the push bar may move toward and away from the rail, but may also move laterally relative to the rail. Of course, the push bar may have any suitable motion pattern, as the present disclosure is not so limited. The exit device may house an ELR mechanism within the rail according to exemplary embodiments described herein. A crank of the ELR mechanism may engage the push bar (e.g., via a mating plate) to apply force to move the push bar from the extended position to the retracted position. In some embodiments, the ELR mechanism may not interfere with the movement of the push bar from the extended position to the retracted position. Accordingly, a push bar may be manually moved from the extended position to the retracted position at any time, regardless of the state of the ELR mechanism. However, as will be discussed further below, in some embodiments the ELR mechanism may prevent movement of the push bar from the retracted position to the extended position, such as when the ELR mechanism is used to hold the push bar in a dogged state.

In some embodiments, the crank head and crank of an ELR mechanism may be coupled to one another such that the crank is at least partially rotatable relative to the crank head. That is, the crank may rotate independently in at least one direction relative to the crank head. The crank and crank head may be coupled to one another with a compliant coupling that transmits force between the crank and crank head but allows at least some relative rotation between the crank and crank head. Accordingly, when the crank is held in a stationary position, the crank head may continue to rotate in at least one direction. Likewise, when the crank head is held in a stationary position, the crank may continue to rotate in at least one direction. In some embodiments, the compliant connection may be at least one spring. The at least one spring may be positioned between the crank head and the crank to transmit force from the crank head to the crank and from the crank to the crank head. The springs may be configured to absorb relative movement between the crank head and crank when one of the crank head and crank are held stationary. That is, the at least one spring may store energy when the crank head is rotated relative to the crank as the at least one spring compresses or otherwise deforms to accommodate the relative rotation. In some embodiments, the at least one spring may be configured as a torsion spring. In some embodiments, the at least one spring may be configured as a compression spring. In some embodiments, the at least one spring may be configured as multiple (e.g., two) compression springs. In some cases, multiple compression springs may be employed to provide greater force transmission between the crank and crank head when the compression springs are deformed compared to a torsion spring or single compression spring. Of course, any suitable type or number of springs may be employed to couple a crank to a crank head, as the present disclosure is not so limited.

According to exemplary embodiments described herein, an arrangement of an ELR mechanism including a compliant coupling between a crank head and a crank may allow a crank head to be driven by an actuator past a position corresponding to a retracted position of the push bar without risk of burning out of the actuator or otherwise causing damage to components of the exit device or ELR mechanism. Accordingly, such an arrangement may allow the ELR mechanism to be used with a wide variety of exit devices having a variety of travel distances for the push bar moving between an extended position and a retracted position. As will be discussed further herein, in some embodiments an ELR mechanism may detect when the crank stops moving as the crank head is driven by the actuator, triggering the ELR mechanism to stop the actuator. As the crank head is able to rotate at least partially relative to the crank, the ELR mechanism has time while the crank head remains driven to determine the push bar has reached a retracted position and may stop the crank head without risk to any components of the ELR mechanism or push bar. This time provided by the relative rotation of the crank and crank head may be such that the ELR mechanism may be operated without programming a specific amount of rotation of the crank head to retract a push bar, and the ELR mechanism can be employed across a wide range of exit devices having different distances of travel of the push bar. That is, the operation of the ELR mechanism may be based on the determination of the end of travel of the push bar, and the amount that the crank is driven may be dependent on that determination without pre-programming specific amounts of rotation of the crank head. Accordingly, the ELR mechanism may automatically adapt to a variety of push bar travel amounts without any specific configuration by a user. Additionally, the ELR mechanism may be able to adapt to changes in push bar travel over time due to wear or other conditions affecting the exit device.

According to exemplary embodiments described herein, a crank head and a crank may rotate relative to one another by a predetermined amount suitable to allow an ELR mechanism to determine that the crank has stopped moving. In some embodiments, the crank may be rotatable relative to the crank head in a single primary direction. For example, the crank and crank head may be in rigid engagement with one another when the crank head is rotated in a first direction, but the crank may rotate relative to the crank head when the crank head is rotated in a second, opposite direction. Of course, in some embodiments, a crank may rotate relative to a crank head in any suitable direction, as the present disclosure is not so limited. In some embodiments, the crank may rotate relative to the crank head by an angle of less than or equal to 20 degrees, 15 degrees, 10 degrees, 5 degrees, and/or any other appropriate angle. Correspondingly, the crank may rotate relative to the crank head by an angle greater than or equal to 1 degree, 2 degrees, 5 degrees, 10 degrees, and/or any other appropriate angle. Combinations of the above-noted ranges are contemplated, including angles between 1 and 10 degrees, 5 and 15 degrees, 1 and 20 degrees, as well as 5 and 20 degrees.

In some embodiments, an ELR mechanism may include a sensor configured to determine when a crank has stopped moving. When the crank has moved a push bar from an extended position to a retracted position, the push bar may not be able to move further in the same direction. Accordingly, once the push bar reaches the retracted position, the crank applying force to move the push bar may also stop and be unable to move the push bar. The sensor may be configured to detect when the crank and/or push bar stops moving, so that an actuator of the ELR mechanism driving the crank may be stopped. Such an arrangement may allow the ELR mechanism to be employed in a variety of different exit devices having different push bar travel amounts without pre-programing or specifically configuring the ELR mechanism. Instead, the ELR mechanism may simply detect when the crank and/or push bar stops moving with the sensor for any push bar travel and subsequently stop driving the crank. In this manner, the ELR mechanism may be controlled in a way that is universal to a wide range of exit devices having different amounts of push bar travel, as the push bar travel is detected when the ELR mechanism is operated. Furthermore, such an arrangement may allow the ELR mechanism to automatically adapt to changes in push bar travel over the lifetime of an exit device due to wear or other conditions, as the sensor may detect the changed push bar travel.

In some embodiments, a sensor of an ELR mechanism may be a Hall Effect sensor configured to detect changes or lack thereof in a magnetic field. The Hall Effect sensor may detect a change in the magnetic field as the push bar moves from the extend position to the retracted position, and may detect a ceasing of change in the magnetic field once the push bar is in the retracted position. In some embodiments, once the magnetic field does not change or does not exceed a threshold change for a predetermined amount of time, the ELR mechanism may stop the actuator. In some embodiments where a Hall Effect sensor is employed, the sensor may be disposed in a stationary rail of an exit device, and a magnet may be positioned on the crank or a portion of the push bar. In other embodiments, the sensor may be a potentiometer or rotary encoder coupled to the crank and configured to measure the absolute position or incremental position of the crank. Of course, any suitable sensor may be employed with an ELR mechanism, as the present disclosure is not so limited.

In some embodiments, a method of operating an electronic latch retraction (ELR) mechanism includes engaging a push bar with a crank of the ELR mechanism. The method may also include rotating a crank head from a first rotational position to a second rotational position, where rotating the crank head from the first rotational position to the second rotational position correspondingly rotates the crank. In some embodiments, force may be transmitted from the crank head to the crank via a compliant coupling, such as at least one spring. In some embodiments, the crank head may be coupled to the output shaft of an actuator, which may rotate the crank head from the first rotational position to the second rotational position. The method may also include moving the push bar from an extended position to a retracted position with the crank as the crank head rotates from the first rotational position to the second rotational position. In some embodiments, the crank may be in sliding contact with a mating plate coupled to the push bar, such that the crank acts as a cam and imparts linear force to the mating plate as the crank rotates. The method may also include stopping the crank when the push bar is in the retracted position. In some embodiments, the crank is physically stopped by the end of travel of the push bar. The method may include rotating the crank head from the second rotational position to a third rotational position while the crank is stopped and the push bar is in the retracted position. In some embodiments, the stoppage of the crank may be detected by a sensor while the crank head is rotated to the third rotational position. The crank head may be stopped in the third rotational position once the sensor detects the crank and/or push bar is stopped. When the crank head is rotated to the third rotational position, a compliant coupling between the crank and crank heed may allow relative rotation therebetween.

In some embodiments, an ELR mechanism may include a return spring configured to bias a crank head of the ELR mechanism toward a first rotational position corresponding to a position where an associated push bar is in an extended position. In some embodiments, the return spring may be configured to allow the crank head to return to the first rotational position with no need to power the actuator, meaning the return spring may have enough force to back-drive the actuator when the actuator is unpowered. In some embodiments, the return spring may combine with a push bar spring to provide biasing force suitable to return the crank head to an initial position after a process of electronic latch retraction. In some embodiments, an exit device may include a push bar spring configured to bias a push bar to an extended position. Accordingly, in some embodiments, the push bar spring may apply force to the crank when the push bar is in a retracted position and the crank head is in a second rotational position. The force from the return spring may combine with the force from the push bar spring to return the push bar to the extended position and the crank head to the first rotational position. In some embodiments, the return spring may be a torsion spring. In some cases, the return spring may supplement the push bar spring to reduce stiction of the crank on a mating plate coupled to the push bar. Such an arrangement may be advantageous in instances where the push bar spring force is low (e.g., 5 lbs. or lower activation force for the push bar). Accordingly, an ELR mechanism with a return spring may also function and may be universally employed with push bars with lesser push bar activation forces. Of course, any suitable spring arrangement may be employed including a return spring or not, as the present disclosure is not so limited.

According to exemplary embodiments described herein, an ELR mechanism may include an actuator configured to drive a crank head in at least one direction. In some embodiments, the actuator may be an electric actuator, such as a DC motor, servomotor, stepper motor, brushless motor, etc. In some embodiments, the electric actuator may be coupled to a gearbox configured to reduce the output of the electric actuator, to ultimately provide more torque at an output shaft of the actuator that is coupled to a crank head. The actuator may be powered by any appropriate energy source, including, but not limited to, batteries, capacitors, and/or power from an electrical grid (e.g., in-wall power). Of course, in other embodiments any suitable actuator employing any suitable energy source may be employed, such as a pneumatic actuator, hydraulic actuator, etc., as the present disclosure is not so limited.

In some embodiments, an ELR mechanism may include a processor configured to execute computer readable instructions stored in non-volatile memory. The processor may be configured to execute a series steps to retract a push bar of an exit device and or hold a push bar of an exit device in a retracted position. In some embodiments, the processor may receive information from one or more sensors, such as a sensor configured to detect when a push bar is in a retracted position and/or when a crank is stopped. In some embodiments, the processor may be configured to interface with a communications module allowing the processor to send and/or receive messages. In some embodiments, the processor may be configured to send a status message to one or more other devices. The status message may include various states of the ELR mechanism, such as whether a push bar is retracted, a number of activations of the mechanism, a power state of the ELR mechanism (e.g., battery remaining), etc. The processor may communicate over a wire or wirelessly. In some embodiments, the ELR mechanism communications module may include a transceiver configured to allow the ELR mechanism to communicate via one or more radio frequencies, such as Bluetooth, Bluetooth Low Energy, 802.15.4, Wi-Fi, GSM, HSPA+, LTE, WiMax, and NFC. In some embodiments, the processor may be configured to communicate with one or more other devices, including, but not limited to, a mobile device, a central controller, a remote server, a local server, and/or a local computer. In some embodiments, the processor may be configured to receive commands from another device. For example, the processor may be configured to receive a command to retract the push bar and/or to hold the push bar in the retracted position.

According to exemplary embodiments described herein, an ELR mechanism may be employed to dog a push bar of an exit device such that the push bar of the exit device is retained in a retracted position. In some embodiments, a crank of the ELR mechanism may be configured such that when a crank head is rotated to a second rotational position and the push bar is retracted, the lever arm through which the push bar applies torque to the crank may be at a minimum. That is, when the crank head is stopped in a rotational position where the push bar is retracted, the torque back-driving the crank (e.g., from a push bar spring) may be at a minimum. The lever arm may be determined based on an angle between the crank and an axis parallel to a direction in which the push bar is retracted (e.g., perpendicular to a door or perpendicular to a base plane of the ELR mechanism). The smaller the angle between the crank and this axis, the lesser the lever arm and the less torque applied to the crank by the push bar. Accordingly, if the crank is aligned with the axis, then the push bar may apply no torque to the crank, meaning the push bar is mechanically dogged and held in a retracted position. In such a state, no power may be drawn from an actuator to maintain the push bar in the retracted position. Of course, in other embodiments there may be a non-zero angle between the crank and the axis. In such cases, the actuator may draw power to maintain the push bar in the retracted position. However, compared to the power employed to retract the push bar originally, this power drawn to maintain the push bar in the retracted position may be less due to the reduced lever arm. Of course, a crank of an ELR mechanism may have any suitable arrangement and may be positioned at any angle relative to an axis parallel to the direction the push bar is retracted, as the present disclosure is not so limited.

As noted above, the angle between a crank and an axis parallel to a direction of retraction of a push bar (e.g., perpendicular to a door or perpendicular to a base plane of the ELR mechanism) may affect the lever arm applying torque to the crank head which is compensated for via torque applied by an actuator. The smaller the lever arm, the less torque applied by the actuator to maintain the push bar in a retracted position, thereby correspondingly reducing the power consumption of the actuator to hold the push bar in the retracted position. In some embodiments, when the crank head is in a second rotational position corresponding to the push bar being retracted, the crank maybe offset from an axis parallel to a direction of the retraction of the push bar by an angle less than or equal to 45 degrees, 30 degrees, 25 degrees, 20 degrees, 15 degrees, 10 degrees, 5 degrees, and/or any other appropriate angle. Correspondingly the crank may be offset from the axis by an angle greater than or equal to 1 degree, 5 degrees, 10 degrees, 15 degrees, 20 degrees, 25 degrees, 30 degrees, and/or any other appropriate angle. Combinations of the above-noted ranges are contemplated, including angles between 15 and 45 degrees, 1 and 15 degrees, 5 and 30 degrees, as well as 10 and 45 degrees.

In some embodiments, a method of operating an ELR mechanism to dog an exit device may include rotating a crank head with an actuator to move a push bar to a retracted position with a crank coupled to the crank head. The method may also include moving the crank to within 30 degrees of an axis parallel to a direction of retraction of the push bar (e.g., perpendicular to a door or perpendicular to a base plane of the ELR mechanism). In some embodiments, the crank may be moved within 10 degrees of the axis. In still other embodiments, the crank may be aligned with the axis. In such an embodiment, the actuator may stop applying torque to the crank, and the push bar may be held in the retracted position, resulting in the exit device being in a dogged state. In other embodiments, the actuator may apply torque to the crank to maintain the push bar in the retracted position to keep the exit device in a dogged state. In some embodiments, the method includes stopping the actuator from applying force, where the push bar is returned to an extended position when the actuator stops applying force. The push bar may be returned to the extended position by a push bar spring.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a perspective view of one embodiment of an exit device 100. As shown in FIG. 1A, the exit device includes a rail 102, a latch 104, a chassis cover 106, and a push bar 110. The rail 102 is configured to be mounted to a door (for example, see FIG. 1B) and supports the various components of the exit device. The push bar is configured to move between an extended position and a retracted position to correspondingly engage or disengage the latch to secure an associated door. When the push bar is in the extended position, the latch 104 in an engaged position where the latch may engage a strike of a door frame. When the push bar is in the retracted position, the latch may be move into the chassis cover 106 to the disengaged position, such that the strike may be cleared and the door opened. The push bar 110 is configured to move to the retracted position under application of force in a direction toward the rail 102 (e.g., in a direction perpendicular to a plane of a door on which the rail is mounted).

Figure 1B:
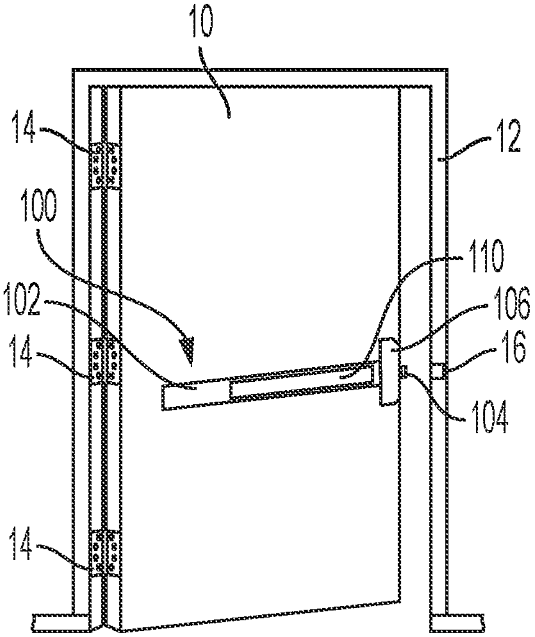
FIG. 1B is a schematic of the exit device of FIG. 1A mounted to one embodiment of a door.

FIG. 1B depicts a schematic of the exit device 100 of FIG. 1A mounted to a door 10. As shown in FIG. 1B, the door in secured in a door frame 12 via a plurality of hinges 14. As noted previously, the exit device 100 is configured to selectively secure the door to the door frame to prevent the door from opening. In particular, the latch 104 is configured to move between an engaged position where the latch engages a strike 16 of the door frame and a disengaged position where the latch clears the strike so the door may swing open. The movement of the latch is controlled by movement of the push bar 110 between an extended position and a retracted position.

Figure 2:
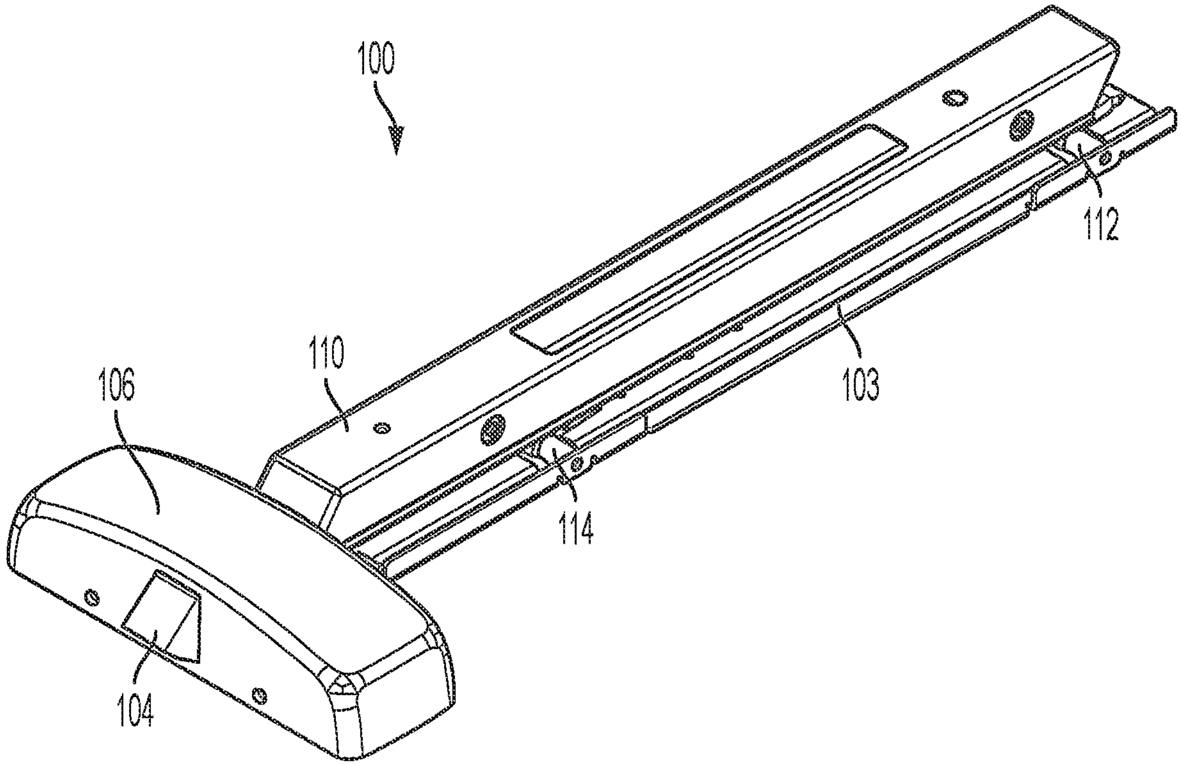
FIG. 2 is a perspective view of the exit device of FIG. 1A with a rail partially removed.

FIG. 2 is a perspective view of the exit device 100 of FIG. 1A with the rail partially removed. As shown in FIG. 2, the push bar 110 is suspended from a rail base 103 with multiple levers. That is, a first lever 112 and a second lever 114 are rotatably mounted to both the push bar 110 and the rail base 103. Accordingly, the push bar may be moved between the retracted and extended positions along the arc of the rotating levers. Of course, in other embodiments the push bar may move substantially linearly or may use any other suitable direction of travel, as the present disclosure is not so limited. As used herein, the retracted position is a position closest to the rail base and the extended position is a position furthest from the rail base. The retracted position and extended positions may be set such that the latch is appropriately engaged or disengaged when the push bar is moved between the extended and retracted positions, respectively. As noted previously, depending on the particular exit device, the distance of translation of the push bar between the extended position and the retracted position may change. For example, levers of different sizes may affect the distance traveled by the push bar as the push bar moves from the extended position to the retracted position.

Figure 3:
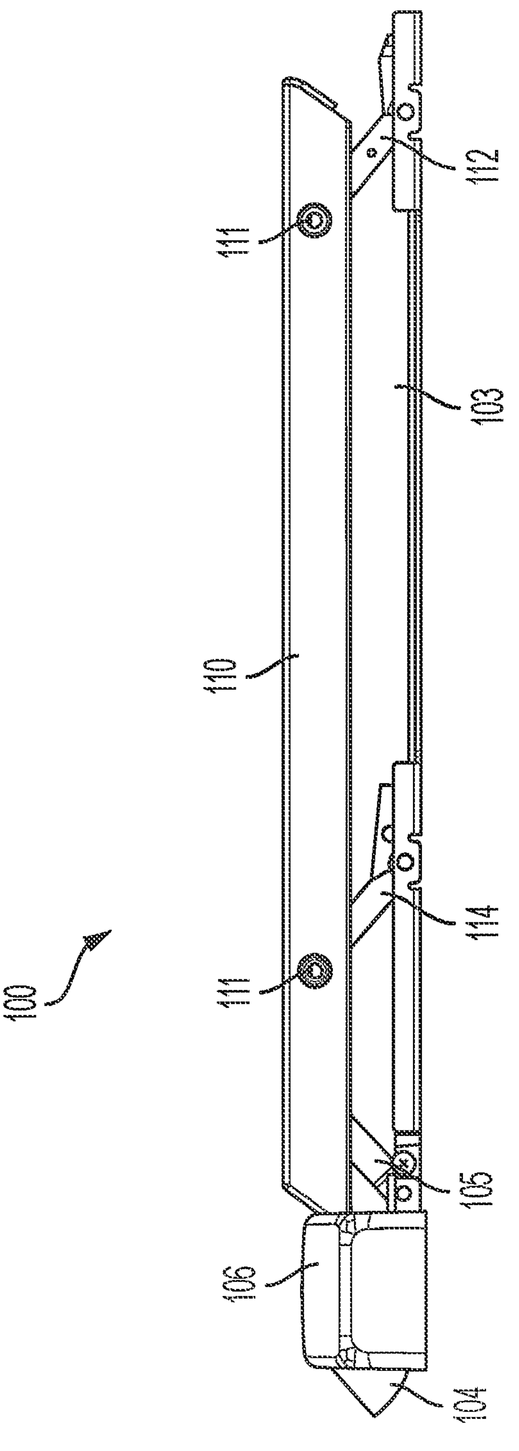
FIG. 3 is a first side elevation view of the exit device of FIG. 1A with a rail partially removed.

FIG. 3 depicts a first side elevation view of the exit device 100 of FIG. 2. As shown in FIG. 3, the exit device includes a latch lever 105 which is used to transmit the motion of the push bar between the retracted and extended positions and the motion of the latch between the engaged and disengaged positions. The latch lever may abut the push bar so that the latch lever is rotated by the push bar when the push bar is moved toward the retracted position. The latch lever may make sliding contact with the push bar as the latch lever rotates to move the latch to the disengaged position. The first lever 112 and second lever 114 are coupled to the push bar at hinge portions 111 which allow the levers to rotate relative to the push bar when the push bar is moved. One or more of the levers may include a push bar spring which biases the push bar toward the extended position. In some embodiments, each of the first lever, second lever, and latch lever include a push bar spring urging the push bar toward the extended position. Of course, in other embodiments, a single push bar spring may be employed, as the present disclosure is not so limited. Any suitable spring may be employed as a push bar spring, including, but not limited to, a torsion spring, compression spring, or tension spring. Additionally, multiple types of push bar springs may be employed in a push bar in any suitable combination to bias the push bar to the extended position, as the present disclosure is not so limited.

Figure 4:
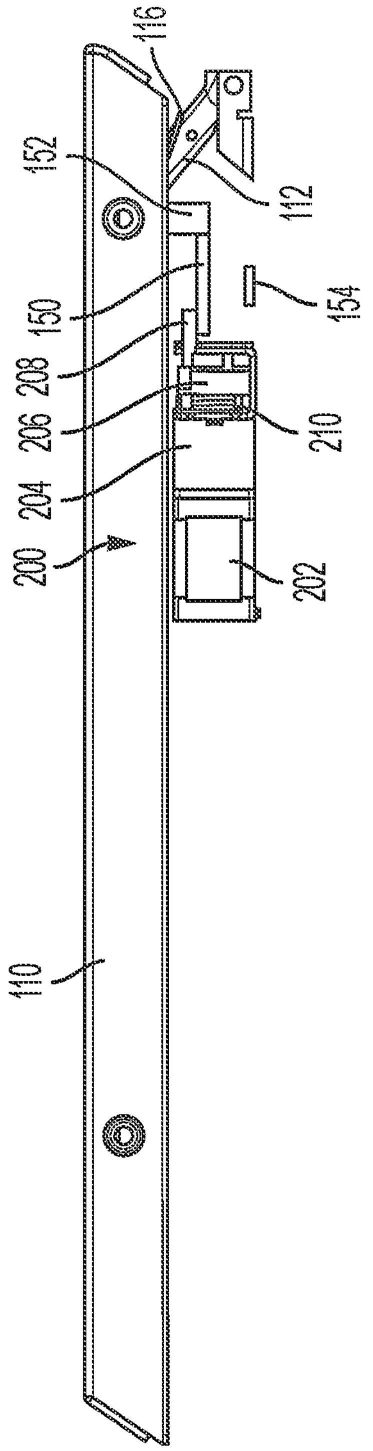
FIG. 4 is a first side elevation view of a push bar and one embodiment of an electronic latch retraction mechanism.

FIG. 4 is a perspective view of one embodiment of a push bar 110 and electronic latch retraction (ELR) mechanism 200. According to the embodiment shown in FIG. 4, the ELR mechanism is configured to selectively move the push bar to the retracted position. That is, the ELR mechanism is configured to apply force to the push bar to move the push bar from the extended position toward the retracted position. Accordingly, the ELR mechanism applies a retraction force to the push bar to move an associated latch to a disengaged position. As shown in FIG. 4, the ELR mechanism is coupled to the first lever 112 and is configured to control the motion of the push bar through the first lever. In particular, the ELR mechanism engages a mating plate 150 which is coupled to the first lever 112 via a bracket 152. However, any suitable lever may be employed, and the ELR mechanism may be coupled to a second lever (for example, see second lever 114 in FIGS. 2-3) or any other lever or coupling configured to control motion of the push bar.

According to the embodiment of FIG. 4 and as will be discussed further with reference to FIGS. 5-6, the ELR mechanism 200 includes an actuator 202 coupled to a gearbox 204. The output shaft of the actuator and gearbox combination is coupled to a crank head 206. The crank head is in turn configured to drive a crank 208. The crank 208 is configured to engage the mating plate 150 on a side of the mating plate facing the push bar 110 (e.g., a side of the mating plate opposite a rail of an exit device, or a side of the mating plate opposite a door). The crank is configured to make sliding contact with the mating plate, such that force may be applied to the push bar in a retraction direction to move the push bar to the retracted position as the crank 208 is rotated by the actuator 202. According to the embodiment of FIG. 4 the crank head is configured to rotate from a first rotational position (as shown in FIG. 4) to a second rotational position where the push bar is in the retracted position. As shown in FIG. 4, the ELR mechanism may include a sensor 154 (e.g., a Hall Effect sensor) configured to detect when the push bar is in the retracted position. In particular, the sensor 154 may detect a change in magnetic field based on the movement of a magnet disposed on the mating plate 150 and/or crank 208. As will be discussed further with reference to FIGS. 7A-7B, such an arrangement may provide simplified universal control of the actuator regardless of a travel distance of the push bar 110 between the extended position and retracted position.

According to the embodiment of FIG. 4, the first lever 112 includes a push bar spring 116 configured to bias the push bar 110 toward an extended position. In the specific embodiment shown, the push bar spring is a torsion spring. However, in other embodiments, any suitable spring may be employed to bias the push bar to the extended position, as the present disclosure is not so limited. In some embodiments, the force from the push bar spring may return the crank 208 to the position shown in FIG. 4 following an electronic latch retraction process. That is, the force from the push bar spring 116 may back-drive the actuator 202 via the mating plate 150 and crank 208 to return the crank to an initial position where the push bar 110 is in an extended position. Of course, in some embodiments, the actuator 202 may be powered to back-drive the crank head 206 and return the crank 208 to an initial position, or any suitable arrangement may be employed, as the present disclosure is not so limited. According to the embodiment of FIG. 4, the ELR mechanism 200 also includes a return spring 210 configured to bias the crank 208 via the crank head 206 to the initial position shown in FIG. 4. That is, the return spring 210 applies a biasing force to the crank head 206 to urge the crank head to a first rotational position where the push bar is in an extended position. The return spring 210 of FIG. 4 is arranged as a torsion spring, but in other embodiments are suitable spring may be employed. The return spring 210 and push bar spring 116 accordingly cooperate to provide a biasing force to return the push bar 110 to an extended position when the actuator 202 is unpowered. In this manner, the ELR mechanism arrangement of FIG. 4 may be fail-secure, where a latch will automatically move to an engaged position as the push bar moves to the extended position following a power interruption to the actuator 202. Of course, in other embodiments the ELR mechanism may be fail-safe, where the spring forces generated by the push bar spring and/or return spring may be not great enough to back-drive the actuator, and accordingly if the push bar is in the retracted position it may stay in the retracted position until power is restored to the actuator or the crank head is manually moved.

According to the embodiment of FIG. 4, in some embodiments the ELR mechanism 200 is configured to block motion of the push bar 110 from the retracted position toward the extended position. In this manner, the ELR mechanism may be employed to dog the push bar 110. In some embodiments, the ELR mechanism may draw power to maintain the push bar in the retracted position. As will be discussed further with reference to FIGS. 8A-8C, the ELR mechanism may be arranged such that the torque applied by the push bar 110 and push bar spring 116 is as a minimum when the push bar is in the retracted position. Accordingly, the power draw of the actuator 202 to hold the push bar in the retracted position may be relatively less than the power draw to move the push bar from the extended position to the retracted position. According to the embodiment of FIG. 4, the actuator may draw between 500 and 1000 mA to retract the push bar from the extended position, but may draw between 50 and 250 mA to hold the push bar in the retracted position. In some embodiments, the actuator may draw 700 mA to retract the push bar, and may draw 200 mA to hold the push bar in the retracted position. Thus, in some embodiments, the power draw to retract the push bar may be between 3 and 5 times greater than the power draw to hold the push bar in the retracted position. Of course, any suitable power draw may be employed for an actuator of an ELR mechanism, as the present disclosure is not so limited.

Figure 5:
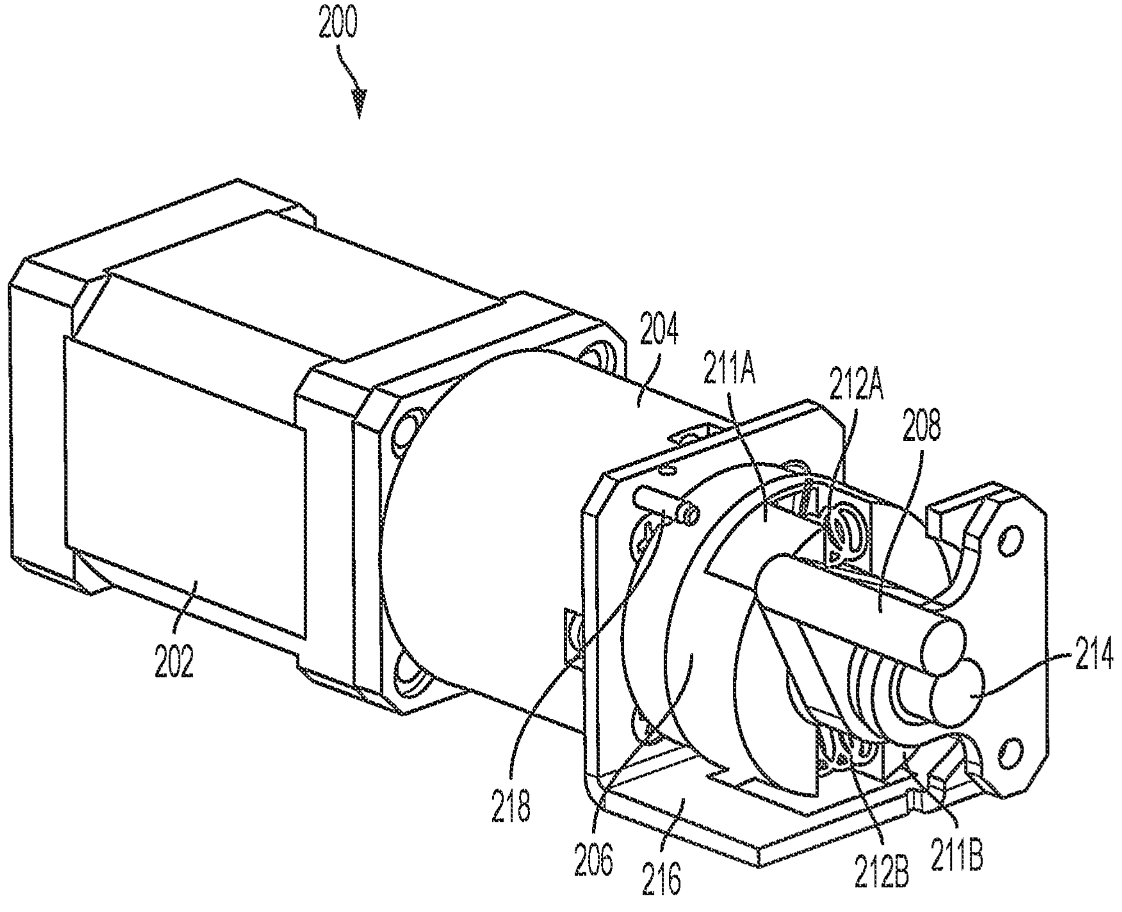
FIG. 5 is a perspective view of the electronic latch retraction mechanism of FIG. 4.

FIG. 5 is a perspective view of the ELR mechanism 200 of FIG. 4. As shown in FIG. 5, the ELR mechanism includes an actuator 202 configured as a DC motor. The actuator 202 is coupled to a gearbox 204 configured to reduce the output of the actuator to increase the torque output of the actuator and gearbox combination. Of course, while a gearbox is employed in the embodiment of FIG. 5, in other embodiments no gearbox maybe employed, as the present disclosure is not so limited. An output shaft of the gearbox 204 and actuator 202 combination is coupled to a crank head 206. The actuator is configured to rotate the crank head 206 between first and second rotational positions. The crank head 206 is supported by a crank head shaft 214 which is disposed in a bracket 216. The bracket reduces the unsupported overhang load on the output shaft of the actuator and gearbox.

As shown in FIG. 5, the crank head 206 is coupled to a crank 208, which is configured to engage a portion of a push bar to apply force to the push bar and move the push bar from an extended position to a retracted position. The crank 208 is compliantly coupled to the crank head 206, such that the crank 208 is able to at least partially rotate relative to the crank head. In particular, the crank is slidably disposed in the crank head, and is coupled to the crank head via a compliant coupling. The compliant coupling of this embodiment includes a first compression spring 212A and a second compression spring 212B arranged on opposite sides of the crank 208. The first compression spring is positioned between the crank head 206 and a first wing 211A of the crank. Likewise, the second compression spring is position between the crank head 206 and a second wing 211B. As the wings 211A, 211B, and the compression springs 212A, 212B are disposed symmetrically about a rotational axis of the crank 208, torque is transmitted between the crank and the crank head via the springs evenly. According to the embodiment of FIG. 5, the crank 208 and the crank head 206 are coaxial, such that the torque transmitted between the crank and crank head is symmetric about the common axis. According to the embodiment of FIG. 5 and as will be discussed further with reference to FIGS. 7A-7C, the first compression spring 212A and second compression spring 212B accommodate relative rotation between the crank and crank head in a single rotational direction. That is, the compression springs are arranged such that the first wing 211A and second wing 211B are in rigid contact the crank head 206, such that torque may be transmitted directly between the crank and crank head when the crank head is rotated in a first direction (e.g., clockwise). However, when the crank head is rotated in a second, opposite direction (e.g., counter-clockwise), the torque is transmitted through the compression springs. Accordingly, the crank is able to rotate in the first direction relative to the crank head when the crank head rotated in the second direction.

In some embodiments, the ELR mechanism 200 may include a return spring configured to bias the crank head to a first rotational position (e.g., as shown in FIG. 5). The return spring may be a torsional spring configured to apply a torque to the crank head. In some embodiments as shown in FIG. 5, the ELR mechanism may include one or more spring pins 218 configured to secure the spring to the ELR mechanism and to provide supports from which the return spring may apply force to the crank head 206. Of course, any suitable arrangement for a return spring may be employed, as the present disclosure is not so limited.

Figure 6:
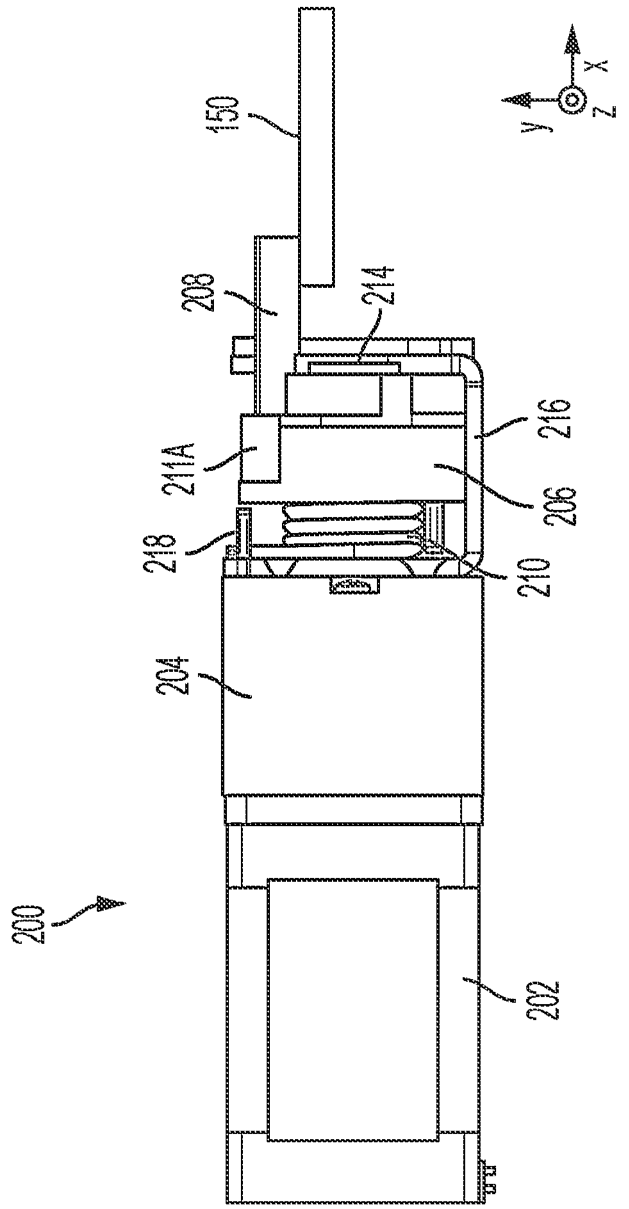
FIG. 6 is a side view of the electronic latch retraction mechanism of FIG. 4.

FIG. 6 is a side view of the electronic latch retraction mechanism of FIG. 4 depicting the engagement between the crank 208 and a mating plate 150 which may be coupled to an associated push bar. As shown in FIG. 6, the crank 208 is cantilevered from the crank head 206. The crank 208 extends across a gap between the mating plate 150 and the bracket 216 to engage the mating plate. As noted previously, the crank 208 is configured to engage one side of the mating plate (e.g., a side of the mating plate facing a push bar), such that the crank may apply force to the mating plate in a single direction. Such an arrangement ensures that a push bar may be manually depressed by a user without interference of the crank, as such a manual operation may simply disengage the mating plate 150 from the crank 208. According to the embodiment of FIG. 6, the crank 208 makes sliding contact with the mating plate 150. Accordingly, the crank 208 functions as a cam, converting rotary motion of the crank into at least partially linear motion of the mating plate 150. As the crank 208 rotates, the crank 208 may slide along the mating plate 150 in one or more directions. For example, the crank may move in a direction parallel to the plane of the mating plate as the crank rotates (e.g., the z-direction). The mating plate may also slide relative to the crank 208 toward or away from the bracket 216 as the push bar moves between an extended position and retracted position (e.g., in the x-direction). For example, when the push bar moves in an arc, the lateral motion component of the movement of the push bar may move the mating plate relative to the crank 208 in a direction toward or away from the bracket 216. Of course, the mating plate and crank may move in any suitable direction relative to one another as a push bar moves from an extended position to a retracted position, as the present disclosure is not so limited.

Figure 7A:
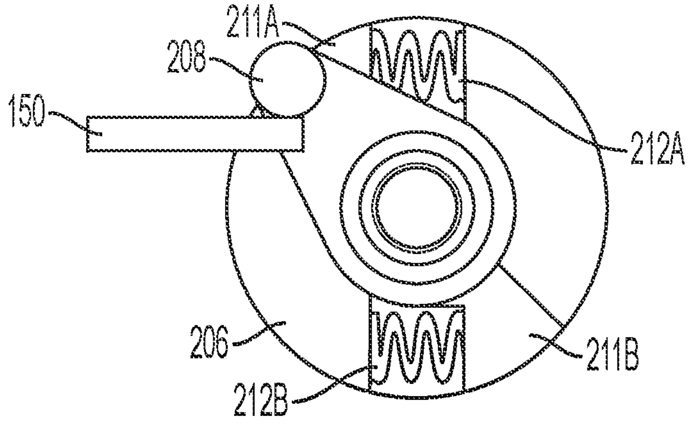
FIG. 7A is a schematic view of one embodiment of an electronic latch retraction mechanism crank in a first state.
Figure 7B:
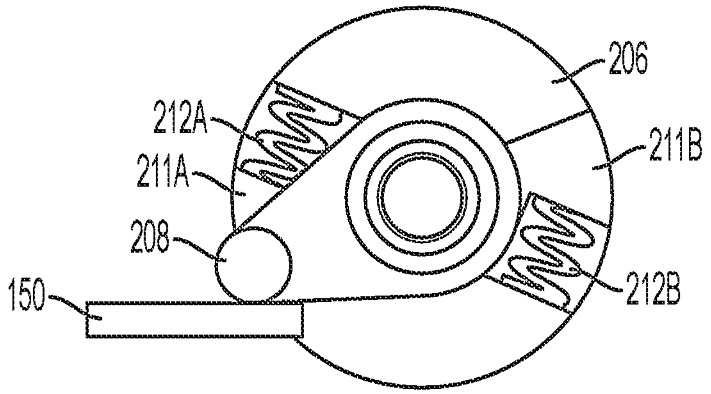
FIG. 7B is a schematic view of the crank of FIG. 7A in a second state.
Figure 7C:
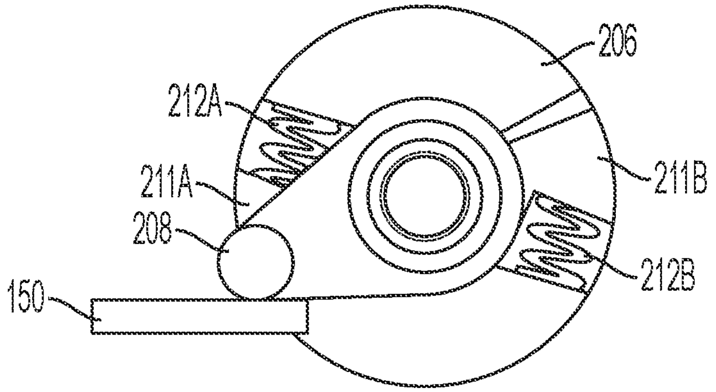
FIG. 7C is a schematic view of the crank of FIG. 7A in a third state.

FIGS. 7A-7C depict schematics of a crank 208 and crank head 206 of an electronic latch retraction (ELR) mechanism through various states of an ELR process. According to the embodiment of FIGS. 7A-7C, the crank 208 and crank head 206 have an arrangement similar to that shown and described with reference to FIG. 5. In particular, the crank 208 is slidably disposed in the crank head 206. A first wing 211A of the crank is coupled to the crank head with a first compression spring 212A. Likewise, a second wing 211B of the crank is coupled to the crank head with a second compression spring 212B. Accordingly, the crank 208 is compliantly coupled to the crank head 206, such that the crank may at least partially rotate relative to the crank head. As in other previously discussed embodiments, the crank 208 engages a mating plate 150 which may be coupled to an associated push bar and may be employed to apply force to retract the push bar.

FIG. 7A depicts the crank 208 and crank head 206 in a first state. The state shown in FIG. 7A may correspond to an initial state, where an associated push bar is in an extended position. The crank head 206 is in a first rotational position, and the crank is in a corresponding first crank position. The first compression spring 212A and second compression spring 212B are in a resting state where the springs are not actively transmitting torque between the crank head and the crank. From the state in FIG. 7A, an associated actuator may apply torque to the crank head 206 (e.g., via an output shaft) to correspondingly apply torque to the crank 208 via the compression springs 212A, 212B. The torque may be converted into force applied to the mating plate 150 by the crank to move the push bar in a retraction direction (e.g., down relative to the page). The crank head 206 and crank 208 may rotate in a first direction (e.g., counter-clockwise relative to the page) to move the mating plate 150 and retract the push bar.

FIG. 7B depicts the crank 208 and crank head 206 in a second state following the application of torque by an actuator. As shown in FIG. 7B, the crank head 206 is in a second rotational position, and the crank 208 is in a second crank position. Relative to one another, the crank head 206 and crank 208 remain effectively in the same position, with any offset for torque transfer through the compression springs 212A, 212B being negligible. However, as torque is transmitted through the compression springs 212A, 212B, there may be some offset to load the compression springs for torque transfer. As shown in FIG. 7B, the mating plate 150 has been moved in a push bar retraction direction (e.g., downward relative to the page). The position shown in FIG. 7B may correspond to a retracted position of an associated push bar. Additionally, according to the embodiment of FIG. 7B, the mating plate 150 may be at an end of travel, meaning additional rotation of the crank 208 may be resisted. However, as the crank head 206 is compliantly coupled to the crank 208, the crank head may continue rotating for at least some amount and the motion may be absorbed by the compression springs 212A, 212B.

In some embodiments as discussed previously, an ELR mechanism may detect when the mating plate 150 reaches this end of travel, or alternatively may detect when the crank 208 encounters rigid resistance from the mating plate. For example, a sensor may detect when the mating plate 150 and/or crank 208 stop moving. In some embodiments the sensor may be a Hall Effect sensor configured to detect change in magnetic field caused by movement of a magnet disposed on the mating plate 150 or crank 208. When the mating plate 150 or crank 208 stop moving, the Hall Effect sensor may detect that the magnetic field has stopped changing while the crank head 206 remains moving. In another embodiment, the crank 208 may be coupled to a rotary encoder configured to detect rotational movement or lack thereof of the crank 208. In some embodiments, the ELR mechanism may determine a lack of movement (e.g., within a threshold movement) of the mating plate 150 and/or crank 208 over a predetermined time period. During this time period, the crank head 206 may continue to rotate in the first direction without risk to the various components, as the compression springs may allow some relative rotation between the crank head and crank. Once the ELR mechanism has determined that the crank and/or mating plate are stopped, the crank head 206 may then be stopped to avoid damage or excessive wear to any components of the ELR mechanism. The state following such a process is shown in FIG. 7C.

FIG. 7C is a schematic view of the crank 208 and crank head 206 of FIG. 7A in a third state. As shown in FIG. 7C, the crank 208 has remained stationary relative to the state shown in FIG. 7B and remains in the second crank position. Likewise, the mating plate 150 has also remained stationary relative to the state shown in FIG. 7B. However, the crank head 206 has rotated further in the first direction (e.g., counter-clockwise relative to the page) to a third rotational position. Accordingly, the crank head 206 has rotated relative to the crank 208. The first compression spring 212A and the second compression spring 212B are correspondingly compressed. While additional torque is transmitted to the crank due to the extra spring compression, such an arrangement provides a smooth torque curve as opposed to an effectively stepwise increase in torque when the travel limit of the mating plate is reached. Accordingly, the compression springs provide a time period in which an ELR mechanism may detect that the crank and/or mating plate have stopped moving, before the torque applied exceeds a threshold value that may damage or excessively wear components. Additionally, such an arrangement allows an ELR mechanism to reliably detect when the travel limit of a push bar has been reached for a given exit device without prior knowledge or programming of a travel distance, meaning that the ELR mechanism employing such an arrangement may be employed across a range of exit devices having different amounts of push bar travel.

After the state shown in FIG. 7C, an associated actuator may apply a holding torque to maintain the mating plate 150 and crank 208 in position so that the push bar remains in a retracted position. In some embodiments, the actuator may apply the holding torque for a predetermine time period, whereupon the actuator may be turned off. Once the actuator is turned off, in some embodiments a return spring and/or a push bar spring may urge the crank head 206 back to the initial position shown in FIG. 7A. Additionally, the first compression spring 212A and second compression spring 212B urge the crank 208 back into an initial position relative to the crank head. Accordingly, the springs of an ELR mechanism and an associated push bar may restore the crank and crank head to the initial position shown in FIG. 7A. The springs may be configured to back-drive an associated actuator while the actuator is unpowered. In some embodiments, the actuator may be powered to drive the crank head 206 in a second direction (e.g., clockwise relative to the page) opposite the first direction. Accordingly, the actuator may assist in restoring the crank and crank head to the initial positions shown in FIG. 7A.

Figure 7D:
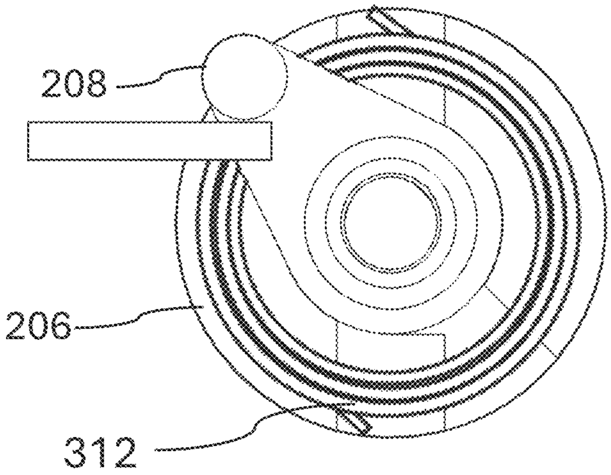
FIG. 7D is a schematic view of another embodiment of an electronic latch mechanism crank.

FIG. 7D depicts a schematic of a crank 208 and crank head 206 of an electronic latch retraction (ELR) mechanism having an arrangement similar to that shown and described with reference to FIGS. 7A-7C. In particular, as shown in FIG. 7D, the at least one spring comprises a torsion spring 312 instead of the two compression springs shown in FIGS. 7A-7C.

While in some embodiments described here include a sensor configured to detect end-of-travel of a crank and/or mating plate directly, in other embodiments end-of-travel may be detected indirectly. For example, in some embodiments, and ELR mechanism may measure the power draw of an actuator as a push bar is retracted. The ELR mechanism may determine that a mating plate and/or crank is stopped (and the push bar is at a travel limit) when the power drawn by the actuator increases above a threshold, or the slope of the power draw changes. Once the crank is stopped and resisted by the push bar, the torque applied by actuator to rotate the crank head may increase linearly as a compliant coupling between the crank and crank head absorbs the relative motion. Accordingly, the slope of the power draw may increase once the travel limit of the push bar is reached, compared to the slope of the power draw when the torque is merely compressing a push bar spring and/or return spring. Such arrangements may allow an ELR mechanism to be employed without installation of a sensor, further simplifying the implementation of ELR mechanisms across a range of similar but different exit devices. Of course, any suitable arrangement may be employed to determine a travel limit of a push bar to stop an actuator, as the present disclosure is not so limited.

In some embodiments, the crank head of an ELR mechanism may rotate a predetermined amount to retract a push bar. The angle of rotation of the crank head may correspond to an amount of travel of an associated push bar in a retraction direction. In some embodiments, the crank head may rotate between a first rotational position and a second rotational position by an angle less than or equal to 180 degrees, 120 degrees, 100 degrees, 90 degrees, 70 degrees, 50 degrees, 45 degrees, and/or another suitable angle. Correspondingly, a crank head may rotate between a first rotational position and a second rotational position by an angle greater than or equal to 10 degrees, 20 degrees, 30 degrees, 40 degrees, 60 degrees, 90 degrees, 120 degrees, and/or another appropriate angle. Combinations of the above noted ranges are contemplated, include angles between 40 and 90 degrees, 20 and 120 degrees, as well as 30 and 70 degrees. Of course, a crank head may rotate by any suitable angle between rotational positions to retract a push bar, as the present disclosure is not so limited.

Figure 8A:
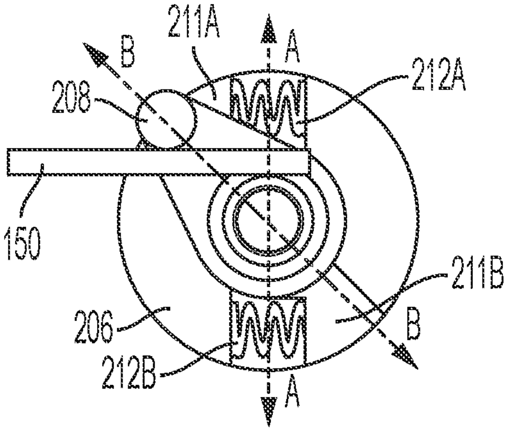
FIG. 8A is a schematic view of another embodiment of an electronic latch retraction mechanism crank in a first state.
Figure 8B:
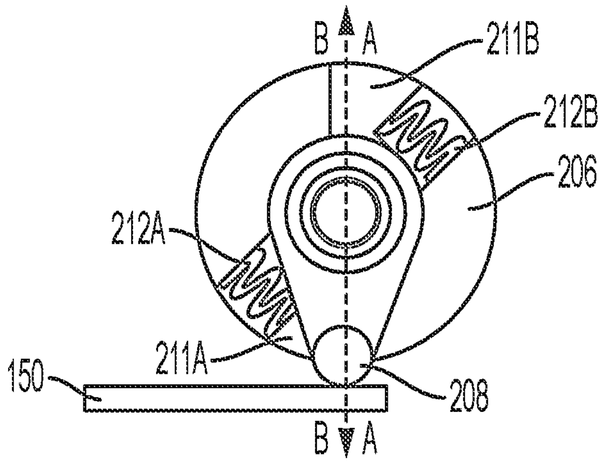
FIG. 8B is a schematic view of the crank of FIG. 8A in a second state.
Figure 8C:
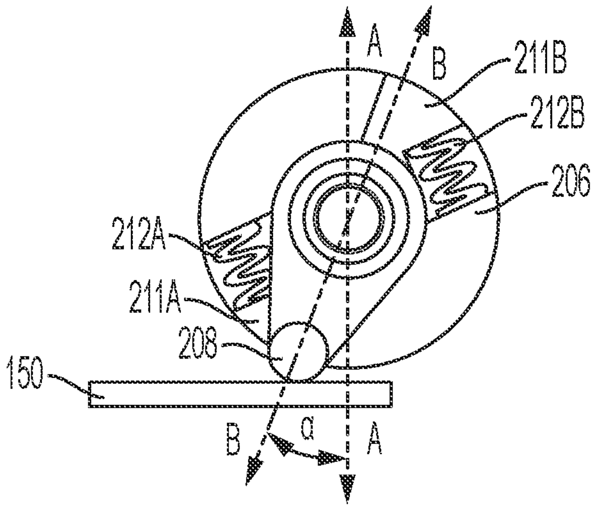
FIG. 8C is a schematic view of the crank of FIG. 8A in a third state.

FIGS. 8A-8C depicts various states of a crank head 206 and a crank 208 of ELR mechanism, similar to the arrangement shown in FIGS. 7A-7C. As shown in FIG. 8A, a center-point of the crank head is aligned with axis A-A. The axis A-A is an axis parallel to a direction of retraction of an associated push bar. Put alternatively, the axis A-A may be perpendicular to the plane of an associated door on which the ELR mechanism is installed, or perpendicular to a base plane of the ELR mechanism. The base plane of the ELR mechanism may be defined by a portion of the ELR mechanism configured to face an associated door. As shown in FIG. 8A, the crank 208 is aligned with a second axis B-B. As the crank 208 and crank head 206 rotate, the axis B-B also rotates. The crank 208 is offset from the axis A-A by an angle between the second axis B-B and the axis A-A. The angle between these axes determines the lever arm of the crank 208 for determining a torque about the center-point of the crank head in a direction parallel to the axis A-A (e.g., a direction of retraction or extension of the push bar). Accordingly, as discussed further with reference to FIGS. 8B and 8B, an ELR mechanism may be arranged so the angle between the crank and the axis A-A is reduced when the associated push bar is in a retracted position. A smaller angle between the crank and axis A-A may reduce the power draw of an actuator holding the push bar in the retracted position, thereby improving the efficiency of the ELR mechanism for dogging an exit device.

FIG. 8B is a schematic view of the crank of FIG. 8A in a second state where the crank 208 is aligned with the axis A-A. That is, the second axis B-B and axis A-A are parallel to one another, meaning there is no angular offset between the crank and the axis A-A. Accordingly, the lever arm of the crank 208 is zero for torque in a direction parallel to axis A-A (e.g., a direction of retraction or extension of the push bar). As a result, an actuator may apply zero torque to balance the force applied to the crank 208 by the mating plate 150. Instead, the force may be resisted by the coupling between the crank and crank head, and ultimately the output shaft of an actuator. This resistance may be purely mechanical, with no active input of torque from the actuator. Thus, in some embodiments, an ELR mechanism may move a crank 208 to an angle of zero or approximately zero (e.g., ±1 degree) relative to the axis A-A, such that a push bar may be mechanically held in a retracted position without any power draw of an actuator. In this manner, the ELR mechanism may function as a mechanical dogging mechanism for an exit device. According to one such an embodiment, the actuator may be powered to move the crank out of the position shown in FIG. 8B to allow the push bar to return to an extended position. According to another such embodiment, an ELR mechanism may include a manual release (e.g., a hex key receptacle) that allows a user to manually turn the crank 208 and crank head 206 to release the push bar from the retracted position.

Of course, in some embodiments, an ELR mechanism may not be particularly designed for a specific travel of a push bar of an exit device. Accordingly, in some cases, a travel limit of a push bar may inhibit movement of a crank 208 to an angle of zero or approximately zero relative to the axis A-A. In some embodiments as shown in FIG. 8C the crank of an ELR mechanism may be moved to a non-zero angle relative to the axis A-A where the lever arm of the torque applied to the crank by the mating plate is still relative reduced compared to a maximum lever arm of the crank (e.g., at 90 degrees relative to the axis A-A). As shown in FIG. 8C, the crank 208 is offset from the axis A-A by an angle $\alpha$. In some embodiments, the angle $\alpha$ may be less than or equal to 30 degrees. In some embodiments, the angle $\alpha$ may be less than or equal to 10 degrees. According to these embodiments, the lever arm of the crank may be relatively small compared to a maximum lever arm of the crank. Accordingly, an actuator may hold the push bar in a retracted position (and the exit device in a dogged state) for a power draw less than that employed to move the push bar from an extended position to the retracted position. For example, such an arrangement may allow an actuator to draw an amount when retracting a push bar that is 3-5 times greater than a power to hold the push bar in a retracted position. Of course, the angle $\alpha$ may have any appropriate value, as the present disclosure is not so limited.

It should be noted that while a flat mating plate is shown and described with reference to exemplary embodiments described herein, any suitable arrangement may be employed to operatively couple the crank of an ELR mechanism to a push bar of an exit device. A mating plate may be curved, inclined, or otherwise have a non-flat shape. Additionally, in some embodiments, a crank may directly engage a push bar of an exit device with no intermediate coupling. Accordingly, the present disclosure is not so limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An exit device comprising: a rail configured to be fixed to a door;

a latch configured to move between an engaged position and a disengaged position;

a push bar configured to move between an extended position, in which the latch is in the engaged position, and a retracted position, in which the latch is in the disengaged position; and a latch retraction mechanism, comprising:

an actuator including an output shaft, a crank head coupled to the output shaft and configured to rotate between a first rotational position and a second rotational position, and a crank rotatably coupled to the crank head such that the crank is at least partially rotatable relative to the crank head, wherein the crank is operatively coupled to the push bar to move the push bar from the extended position to the retracted position when the crank head moves from the first rotational position to the second rotational position;

wherein the crank and crank head are coaxial.

2. The exit device of claim 1, wherein the latch retraction mechanism further comprises at least one spring coupling the crank to the crank head and transmitting force from the crank head to the crank.

3. The exit device of claim 2, wherein the at least one spring is at least one compression spring.

4. The exit device of claim 3, wherein the at least one spring comprises two compression springs, wherein the two compression springs are positioned on opposite sides of the crank.

5. The exit device of claim 2, wherein the at least one spring is a torsion spring.

6. The exit device of claim 2, wherein the at least one spring is configured to accommodate rotation of the crank head relative to the crank in a single rotational direction.

7. The exit device of claim 1, further comprising a push bar spring coupled to the push bar and biasing the push bar toward the extended position.

8. The exit device of claim 1, wherein the crank is disposed at least partially in the crank head.

9. The exit device of claim 8, wherein the crank is slidably disposed in the crank head.

10. The exit device of claim 1, wherein the crank head is configured to rotate about a first axis perpendicular to a direction of travel of the push bar between the extended position and the retracted position.

11. The exit device of claim 1, further comprising a mating plate coupled to the push bar, wherein the crank is engaged with the mating plate.

12. The exit device of claim 11, wherein the crank is configured to engage a side of the mating plate facing the push bar.

13. The exit device of claim 11, wherein the crank is configured to move the mating plate in a push bar retraction direction as the crank head moves from the first rotational position to the second rotational position.

14. The exit device of claim 11, wherein the crank is configured to make sliding contact with the mating plate.

15. The exit device of claim 1, further comprising a sensor configured to detect a position of the crank.

16. The exit device of claim 15, wherein the sensor is a Hall Effect sensor.

17. The exit device of claim 15, wherein the sensor is positioned in the rail.

18. The exit device of claim 1, wherein when the crank head is in the second rotational position, the crank is within 30 degrees of an axis parallel to a direction of travel of the push bar between the extended position and the retracted position.

19. The exit device of claim 18, wherein when the crank head is in the second rotational position, the crank is within 10 degrees of the axis parallel to the direction of travel of the push bar between the extended position and the retracted position.

20. The exit device of claim 1, wherein the first rotational position and the second rotational position are separated by an angle between 40 and 90 degrees.

* * * * *